(12) United States Patent
Goldszmidt et al.

(10) Patent No.: US 6,195,680 B1
(45) Date of Patent: Feb. 27, 2001

(54) CLIENT-BASED DYNAMIC SWITCHING OF STREAMING SERVERS FOR FAULT-TOLERANCE AND LOAD BALANCING

(75) Inventors: German Sergio Goldszmidt, Dobbs Ferry; Marc Hubert Willebeek-LeMair, Yorktown Heights, both of NY (US); Kenneth Sau-yee Hon, Mid-Levels (HK)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,379

(22) Filed: Jul. 23, 1998

(51) Int. Cl.⁷ ..................................................... G06F 13/00
(52) U.S. Cl. ............................................................. 709/203
(58) Field of Search ........................ 364/DIG. 1, DIG. 2; 709/200, 202, 203, 105, 208, 209, 210, 217, 218, 219, 231; 714/4, 2, 22, 3, 6

(56) References Cited

U.S. PATENT DOCUMENTS

| | | | |
|---|---|---|---|
| 5,371,852 | 12/1994 | Attanasio et al. | 395/200 |
| 5,815,663 | * 9/1998 | Vomini | 709/219 |

OTHER PUBLICATIONS

"Overview: Bamba" http://www.alphaworks.ibm.com, Aug. 26, 1996, 4 pages.

IBM eNetwork Dispatcher, http://www.software.ibm.com, May 1998, 17 pages.

"RTP Payload Format for H.263 Video Streams" ftp://ds.internic.net/rfc/ Request for Comments:2190, C. Zhu, Intel Corp, Sep. 1997, 13 pages.

The "Internet Television", Understanding the Browser Basics, http://w3.ag.uiuc.edu/AIM/Discovery/Net/www/television/television.html, Jun. 2, 1998, 2 pages.

K. Bannan, "Philips Magnavox:Philips Magnavox WebTV", http://www.zdnet.com/products/content/pcmg/1604/pcmg0123.html, PC Magazine, Feb. 18, 1997, 2 pages.

K. Bannan, "Sony Electronics Inc.:Sony WebTV Internet Terminal", http://www.zdnet, com/products/content/pcmg/1604/pcmg0125.html, PC Magazine, Feb. 18, 1997, 2 pages.

(List continued on next page.)

*Primary Examiner*—Robert B. Harrell
(74) *Attorney, Agent, or Firm*—Wayne L. Ellenbogen

(57) ABSTRACT

A client-based system for the fault tolerant delivery of real-time or continuous data streams, such as real-time multimedia streams, e.g., live audio and video clips. Multimedia servers are grouped into two or more sets, for example wherein a first set includes one or more primary servers using odd-numbered ports and a second set includes one or more secondary servers using even-numbered ports. The client requests a multimedia stream through a control server or gateway which routes requests to the multimedia servers; and the client receives the stream directly from a selected (primary) server. The client automatically detects load imbalances and/or failures (complete or partial) and dynamically switches to a secondary server in order to continue receiving the real-time multimedia stream with minimal disruption and while maintaining a balanced load across multiple servers in a distributed network environment. The determination can be made based on: the received bit or frame rate (for video); a bit rate or sample rate (for audio); monitoring a delivery rate or for packets arriving out of order: for example using packet numbering mechanisms available in TCP; sequence numbering or time stamp capabilities of RTP (in combination with the User Datagram Protocol (UDP)). In any case, the determination could be based on the rate measurement or monitoring mechanism falling below (or exceeding) some threshold. Alternately, the primary server or the control server could send an explicit distress or switch signal to the client. An explicit signal can be used for example to switch clients in phases with minimal disruption.

46 Claims, 9 Drawing Sheets

OTHER PUBLICATIONS

"desktop conferencing & collaboration", http://www.wpine.com/, May 26, 1998 White Pine Software, Inc., 17 pages.

"CU–SeeMe Reflector", http://www.e92plus.co.uk/reflector.htm, Enhanced CU–SeeMe, Feb. 3, 1998, 2 pages.

Michael Sattler, "Internet TV With Cu–Seeme", Published by Sams Sep. 1995, Abstract from: http://www.amazon.com/exec/obidos/ISBN=1575210061/6156–9453266–197205, Feb. 3, 1998, 2 pages.

Vivo Software, Inc–Home Page, http://www.vivo.com/, 1997 Vivo Software, Inc, May 27, 1998, 4 pages.

Download RealPlayer Plus, http://www.real.com/products/playerplus/index.html?src=download, Copyright (c) RealNetworks,Inc. and/or its licensors, 1995–1998, 4 pages.

InterVu:Home, http://www.intervu.com/, May 26,1998, InterVu, Inc, 3 pages.

Video and Audio: Organization and Retrieval in the WWW, http://www.vosaic.com/corp/papers/www5.html, Z. Chen et al., 17 pages, Jul. 12, 1997.

VOSAIC Corp.Home Page, http://www.vosaic.com/, Copyright (c) 1997–98 Vosaic LLC, 11 pages.

StorNet Texas Home Page, http://stor1.stornet.com/Welcome.html, Mar. 24, 1998, 5 pages.

Marathon Products, http://www.marathontechnologies.com/products.htm, "Continuous Uptime for Windows NT Applications", Mar. 24, 1998, 2 pages.

Software Fault Tolerance, http://www.marathontechnologies.com/software.htm, Marathon's Endurance™ Technology & Software Fault Tolerance, Mar. 24, 1998, 5 pages.

Stardust IP Multicast Initiative—Release, http://www.ipmulticast.com/press/pr980407.hmtl, Television and Internet Multicasting Differences Clarified, Apr. 7, 1998, 3 pages.

MBone(or IP Multicast Information Web, http://www.mbone.com/®1994, 1995, 1996, 1997 Vinay Kumar, 26 pages.

D. M. Dias et al., "A Scalable and Highly Available Web Server", COMPCON '96, 8 pages.

T. Brisco, "DNS Support for Load Balancing", Rutgers University Apr. 1995, Network Working Group Request for Comments: 1794, Category: Informational, 6 pages.

P. Mockapetris, Domain Names—Implementation and Specification, ISI, Nov. 1987, Network Working Group Request for Comments: 1035, 52 pages.

C. R. Attanasio et al., "A Virtual Multiprocessor Implemented by an Encapsulated Cluster of Loosly Coupled Computers", IBM Research Report, Oct. 26, 1992, 2 cover pages and pp. 1–13.

VDOStore–VDOLive Player.Free video streaming client, http://www.clubvdo.net/store/Products/VDOnet/VDOLive_player.asp, May 26, 1998, 5 pages.

H. Schulzrinne et al., "Real Time Streaming Protocol (RTSP)", Network Working Group, Request for Comments: 2326, Category: Standards Track, Apr. 1998, pp. 1–92.

SG15 Plenary May 28, 1966, "Draft Recommendation H.323: Visual Telephone Systems and Equipment for Local Area Networks which Provide a Non–Guaranteed Quality of Service", International Telecommunication Union, 69 pages.

* cited by examiner

CLIENT-BASED DYNAMIC SWITCHING OF STREAMING SERVERS FOR FAULT-TOLERANCE AND LOAD BALANCING

FIELD OF THE INVENTION

This invention relates generally to providing fault tolerance and load balancing for real-time data streaming. More particularly, it relates to a client-based dynamic server switching method for use in a distributed system including multiple servers that are simultaneously transmitting one or more real-time multimedia streams.

BACKGROUND

The demand for real-time multimedia streaming is steadily increasing. In order to increase the scale of network broadcast using real-time multimedia streaming, multiple servers can be used to provide the same multimedia stream to a large number of clients. Clients are directed to one of a multiplicity of servers to obtain the multimedia stream in real-time.

One method known in the art that seeks to increase the processing capacity at hot sites on the Internet is to create a cluster of computing nodes (also called a multi-node cluster) to handle the load. The Internet refers to the collection of networks and gateways that use the Transmission Control Protocol/Internet Protocol (TCP/IP) suite of protocols. TCP/IP is a well known protocol that was developed by the Department of Defense for communications between computers (see e.g., D. E. Comer, "Internetworking with TCP/IP, Principals, Protocols and Architecture,"Prentice Hall, which is hereby incorporated by reference herein in its entirety). The multi-node cluster is (encapsulated) made to appear as one entity to clients, so that the added capacity provided by the multi-node cluster is transparent to clients. Client requests are distributed among nodes in the multi-node cluster. Many load balancing techniques are known in the art; see for example, Dias et al., "A Scalable and Highly Available Web Server", Proc. 41st IEEE Computer Society Intl. Conf. (COMPCON) 1996, Technologies for the Information Superhighway, pp. 85–92, February 1996; see also U.S. Pat. No. 5,371,852, issued Dec. 6, 1994 to Attanasio et al., entitled "Method and Apparatus for Making a Cluster of Computers Appear as a Single Host."

Research and development has also been increasing in both the areas of audio/video streaming and video conferencing. Video conferencing differs from audio and video streaming in that the communication is bi-directional and end-to-end delays must be very low (<200 ms) for interactive communication. In fact, video conferencing standards are quite mature and have emerged from both the International Telecommunication Union (ITU), in the form of the H.3xx standards; and the Internet Engineering Task Force (IETF) in conjunction with the multicast backbone (MBONE). In general, the two camps use the same audio and video compression standards (defined by the ITU), but differ in their networking protocol specifications.

Audio/video streaming differs technically from its video conferencing counterpart in that it can afford greater flexibility in end-to-end delays when being transmitted across a network, and in the fact that stored content may be manipulated off-line with additional processing. These begin to merge when one considers live audio and video streaming applications (e.g., Internet, radio, and TV). The most relevant of the ITU standards is H.323, which defines audio/visual services over LANs for which quality of service cannot be guaranteed (see e.g., "Draft Recommendation H.323: Visual Telephone Systems and Equipment for Local Area Networks Which Provide A Non-Guaranteed Quality of Service," (May 28, 1996), which is hereby incorporated herein by reference in its entirety). This standard specifies a variety of audio and video coders and decoders (CODECs) as well as signaling protocols to negotiate capabilities and setup and manage connections. The underlying transport specified is the Real-time Transport Protocol (RTP). This protocol, defined by the IETF, is intended to provide a means of transporting real-time streams over Internet Protocol (IP) networks. A new protocol, Real Time Streaming Protocol (RTSP), more directly addresses the issues of delivering and managing multimedia streams, (see e.g., "Real Time Streaming Protocol (RTSP)" IETF Request for Comments: 2326 (April 1998), which is hereby incorporated herein by reference in its entirety). Clearly, this area is still evolving as new protocols are being defined and refined to satisfy a wide range of emerging networked multimedia applications.

Streaming technology can be used to deliver live audio and video data, where the clips arrive in streams so that users can begin to view or hear the clip before the download is complete. Conventional Internet traffic is short-lived, with a duration ranging from milliseconds to seconds, and bursty. In contrast, real-time multimedia streaming is lengthy, with a duration ranging from minutes to even hours, with low continuous bandwidth requirements. Server and/or network failures will terminate the real-time streaming process, and the stream from a given server will be interrupted for a particular session. This interruption may, in many cases, only be detected at the client. Thus, a need exists for a client-based means to automatically switch to an alternate server in order to continue receiving a multimedia stream in an uninterrupted fashion in the event of a service degradation, load imbalance, or failure. The present invention addresses such a need.

One known method in the art for increasing scalability for real-time multimedia streaming is through the use of so-called "reflector" technology. The reflector technology is used in applications—such as IBM's BAMBA™, Vosaic's MEDIASERVER™ and White Pine Software's CU-SeeMe™—to provide real-time audio and video streaming over the Internet. Reflectors are servers that manage the distribution of audio and video streams to their receivers. They can be cascaded and scaled to handle increased demand for a broadcast. Multimedia streams are replicated at each reflector and delivered to multiple receivers. By simply adding more reflectors, a broadcast is capable of supporting large numbers of clients.

A key problem with the basic reflector technology is that the resulting workload across reflectors is poorly balanced and network bandwidth can be wasted. For example, some reflectors can have a large number of clients simultaneously connecting to it while others are serving only a few clients. This causes the workload across reflectors to be highly unbalanced and can cause performance degradation due to server and/or network overloads. Another problem with the basic reflector approach, is that in the event that a reflector (server) fails or is overloaded, there is no automatic mechanism for redirecting a client to another server where they will continue receiving the multimedia stream. The present invention addresses these problems.

SUMMARY

Accordingly, it is an object of this invention to provide an improved client-based system for the fault-tolerant delivery of real-time or continuous data streams. In one embodiment, real-time multimedia streams, e.g., live audio and video clips, are delivered in streams so that users can begin to view or hear the clip before the download is complete. The real-time multimedia streams can be lengthy, with durations ranging from minutes to even hours, with low continuous bandwidth requirements. According to the present invention, a receiver (also called a client) automatically detects load imbalances and/or failures (complete or partial) and dynamically switches to an alternate server in order to continue receiving the real-time multimedia stream with minimal disruption.

The present invention includes features for automatically and gracefully switching clients among multiple servers in the event that a server becomes overloaded or fails. A preferred embodiment addresses the case where clients are receiving a continuous multimedia stream and the switching must be transparent to the client and maintain uninterrupted playback of the multimedia streams. When a server fails, its respective client agents detect the failure and automatically switch to alternate servers that continue to provide the client agents with the real-time multimedia streams.

The present invention also includes features for gracefully switching client agents to alternate servers in the case of a server failure or overload while maintaining a balanced load across multiple servers in a distributed network environment.

An example of a system having features of the present invention includes: a control server; two or more streaming servers, and a plurality of client agents. The control server is preferably a scalable server that is capable of handling a requests from a large number of incoming client agents and redirecting them to the streaming servers that are providing the multimedia data. The control server assigns different identifiers to the streaming servers for delivering the multimedia data, and uses these identifiers to group these streaming servers into two or more different sets. The streaming servers are used to deliver the real-time multimedia streams to the client agents. To receive a multimedia stream, client agents are given an identifier to connect to a server in one of the sets.

Each client agent receives the multimedia stream from a streaming server, performs the appropriate processing (e.g., decompression, scaling) on the stream and renders the multimedia output. Each client agent can be provided with a primary server identifier as well as a secondary server set identifier. The primary entry characterizes the primary streaming server in the set of servers the client agent is connecting to. The secondary entry characterizes the set containing an alternate server for the client agent. When a client detects a failure or overload, the client sends a switch request to the control server which then selects a server in the secondary set and redirects the client agents of the primary server to the selected alternate server. Thus, the client agents can continue to receive the multimedia streams with minimal or no interruption.

BRIEF DESCRIPTION OF THE DRAWINGS

These, and further characteristics and features of the invention, will be more apparent from the following detailed description of a preferred embodiment and the appended drawings in which:

FIG. 1b depicts an example of a data structure which can be used to record the relationship between a client and the streaming servers depicted in FIG. 1a;

DETAILED DESCRIPTION

Figure 1A:
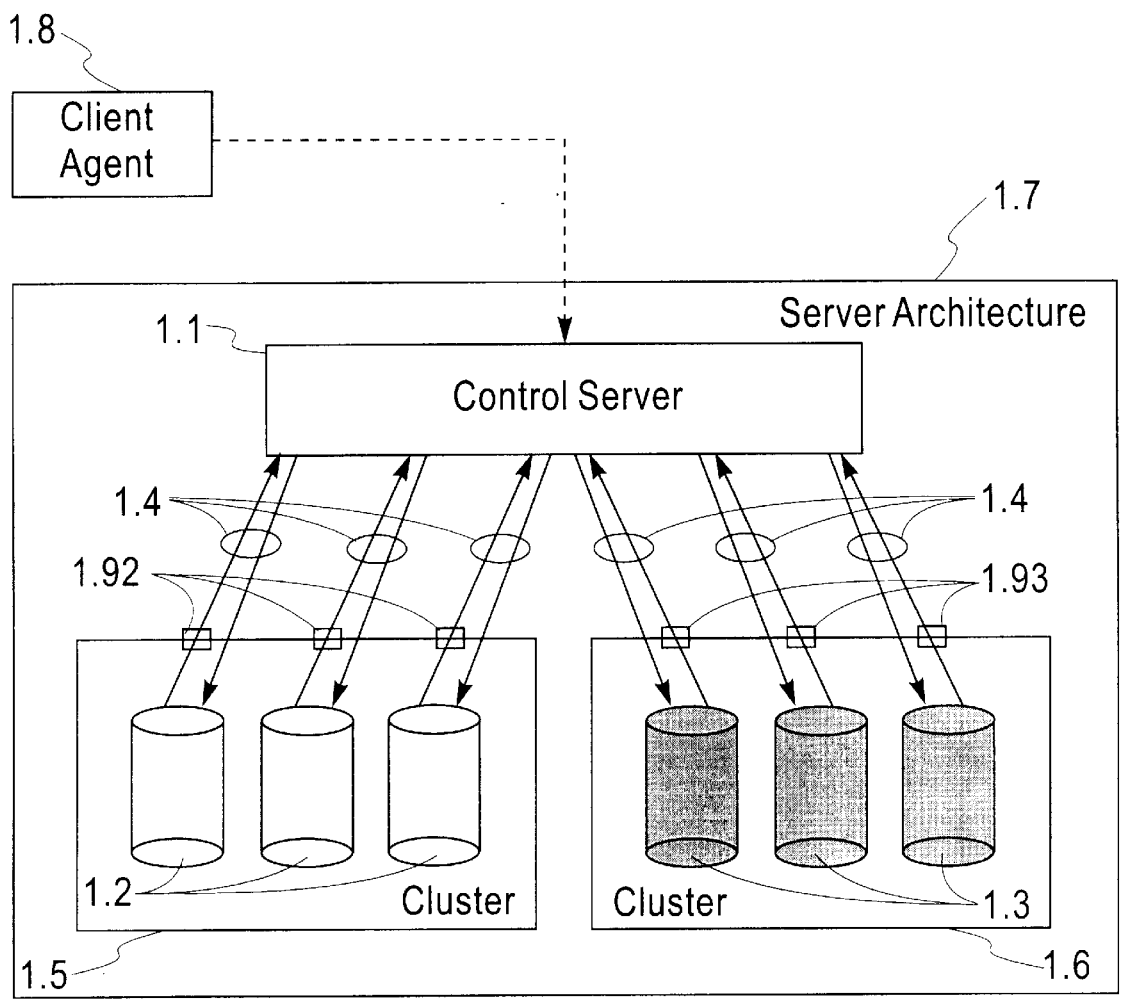
FIG. 1a depicts an example in block diagram form of an environment having features of the present invention.

FIG. 1a illustrates an example of an environment including a server architecture 1.7 and a client agent 1.8 having features of the present invention. The server architecture 1.8 includes a control server 1.1 and at least two sets (1.5, 1.6) (also called clusters) of streaming servers (1.2, 1.3). Each set of streaming servers includes at least one streaming server (1.2, 1.3), each having a number of ports (1.92, 1.93).

In one embodiment, the streaming servers (1.2, 1.3) are assigned to one of the sets (1.5, 1.6) based on a simple arithmetic test. For instance, the assignments may be based on connection port numbers, e.g., all streaming servers using even-numbered ports 1.92 are assigned to one set, and all streaming servers (1.2, 1.3) using odd-numbered ports 1.93 are assigned to another set. The server set assignments could further include considerations including one or more of: size; capacity; location (locality/affinity); and network connectivity, so that a good balance of server availability can be maintained in the two sets. One method to achieve this is for the control server 1.1 to assign any new streaming server to the currently smaller set. Servers in the system are preferably divided into two disjoint non-empty sets—a set which is serving stream data through the odd-numbered port and another set which is serving stream data through the even-numbered port. Both of these sets (1.5, 1.6) contain at least one server (1.2, 1.3). The two sets of servers are preferably mutually exclusive, meaning that no servers in the system can be in these two groups at the same time.

Those skilled in the art will appreciate that many alternatives are available. The control server 1.1 could be a gateway through which client requests must pass and which includes a routing function to distribute client requests among servers in the cluster. For example, a system adaptable to the present invention that provides load balancing in an encapsulated cluster of nodes is described in U.S. Pat. No. 5,371,852, issued Dec. 6, 1994, entitled "Method and Apparatus for Making a Cluster of Computers Appear as a Single Host", by Attanasio et al ('852 patent). The present invention has a common assignee with this U.S. patent, which is hereby incorporated by reference in its entirety. Here, only the address of a Transmission Control Protocol (TCP) router (control server 1.1) is given out to clients 1.8; the TCP router distributes incoming requests among the nodes (streaming servers 1.2, 1.3) in the cluster, either in a round-robin manner, or based on the load on the nodes. In the '852 patent, a Virtual Encapsulated Cluster routes TCP information that crosses the boundary of a computer cluster. The information is in the form of port type messages. Incoming messages are routed and the servers respond so that each cluster appears as a single computer image to the external host. A cluster of servers with a single TCP-router node is divided into a number of virtual clusters (virtual encapsulated clusters). Each virtual encapsulated cluster appears as a single host to hosts on the network which are outside the cluster. The messages are routed to members of each virtual encapsulated cluster in a way that keeps the load balanced among the set of cluster nodes. The TCP router can also act as a proxy, where the requests are sent to a selected node, and the responses go back to the TCP router and then to the client. In a preferred mode of operation, called forwarding mode, client requests are sent to a selected node, and the responses are sent back to the client directly from the selected node, bypassing the router.

Referring again to FIG. 1a, as is conventional, the client 1.8 can be directly connected to the control server 1.1 or over a network (not shown) such as a cable network, telephone network, local area network (LAN), an intranet, or the Internet (or some combination of these). The client agent 1.8 (also called simply client), can be any conventional computer or processor-based machine with a processor, memory and operating system and application software and networking (hardware and software) to communicate requests and receive data streams from a streaming server.

The control server 1.1 redirects incoming client agent 1.8 requests to the streaming servers (1.2, 1.3), preferably while monitoring the workload of the streaming server. The control server is preferably a scalable server that is capable of handling a large number of incoming client agent requests and redirecting them to the streaming servers that are providing the multimedia data. The control server assigns different identifiers to the streaming servers for delivering the multimedia data, and uses these identifiers to group the streaming servers into two or more different sets (1.5, 1.6). By way of example only, one set 1.5 of streaming servers 1.2 is delivering multimedia streams through even-numbered ports 1.92 and another set 1.6 of streaming servers 1.3 is delivering the multimedia streams through odd-numbered ports 1.93. Port-based routing of TCP connections is well known in the art (see for example the aforementioned '852 patent).

As is also conventional, communication channels 1.4 exist between the control server 1.1 and the streaming servers (1.2, 1.3), allowing the control server to preferably monitor the workload of the streaming servers while redirecting incoming client agent 1.8 requests to them.

Each instance of the streaming process begins with a client agent 1.8 connecting to the control server 1.1 requesting the multimedia stream. The control server then assigns and redirects the client to one of the streaming servers in either of the two groups (1.5, 1.6). The assignment can be based on a conventional round-robin approach or based on some load-balancing heuristics. For example, the server 1.1 can redirect the client 1.8 to a streaming server based on a weighted round-robin approach, or to a streaming server having a lowest utilization rate.

An example of a system for weighted TCP routing is described in co-pending U.S. patent application Ser. No. 08/701,939, filed Aug. 23, 1996, now U.S. Pat. No. 5,918,017, entitled "Weighted TCP Routing to Service Nodes in a Virtual Encapsulated Cluster" by C. Attanasio, G. Hunt, G. Goldszmidt, and S. Smith (IBM Docket No. YO996167), now U.S. Pat. No. 5,918,017. The present invention has a common assignee with this co-pending patent application, which is hereby incorporated herein by reference in its entirety.

An example of a Fault Tolerant Recoverable TCP/IP Connection Router (FTR-CR) and methods of connecting at least two FTR-CRs to multiple systems, where the FTR-CRs have synchronized internal tables and are capable of switching between active and standby states is described in co-pending U.S. patent application Ser. No. 08/929,409, entitled "FAULT TOLERANT RECOVERABLE TCP/IP CONNECTION ROUTER," by Baskey et al., filed Sept. 15, 1997, (IBM Docket No. YO997232). The present invention has a common assignee with this co-pending patent application, which is hereby incorporated herein by reference in its entirety. A recoverable TCP/IP Connection Router is a virtual encapsulated cluster which has two TCP-router nodes, a primary and a backup. The server cluster is augmented with a recovery manager which causes the backup TCP-router to become active if the primary fails. The connection state at the time of failure can be reconstructed by (or alternatively known at) the backup router so that zero or a minimum number of client connections will be lost due to failure of the TCP-router node. The configuration/management information of the virtual encapsulated cluster is also replicated (or constructed) at the backup. Finally, the start up protocol of the TCP-router node is changed so that recovery of the primary router will not cause a failure in a backup that has taken over for it.

An example of an affinity-based router and method for routing and load balancing in an encapsulated cluster of server nodes is described in co-pending U.S. patent application Ser. No. 08/947,361, filed Oct. 8, 1997, entitled "Affinity-based Router and Routing Method," by Dias et al., (IBM Docket No. YO996265). The present invention has a common assignee with this co-pending patent application, which is hereby incorporated herein by reference in its entirety. The affinity-based system includes a multi-node server, wherein any of the server nodes can handle a client request, but wherein clients have affinity to one or more of the server nodes that are preferred to handle a client request. Such affinity is due to state at the servers either due to previous routing requests, or data affinity at the server. At the multi-node server, a node may be designated as a TCP router. The address of the TCP router is given out to clients, and client requests are sent thereto. The TCP router selects one of the nodes in the multi-node server to process the client request and routes the request to this server; in addition, the TCP router maintains affinity tables, containing affinity records, indicating which node a client was routed to. In processing the client request, the server nodes may determine that another node is better suited to handle the client request, and may reset a corresponding TCP router affinity table entry. The server nodes may also create, modify or delete affinity records in the TCP router affinity table. Subsequent requests from this client are routed to server nodes based on any affinity records, possibly combined with other information (such as load).

An example of a port-based TCP connection router which includes load balancing and high availabilty functionality is available from the IBM Corporation under the trademark "ENETWORK DISPATCHER." Those skilled in the art will appreciate however that any connection routing or load balancing heuristics known in the art can be applied to the system described herein.

Each client agent 1.8 can be provided with a primary and a secondary server identifier. The primary entry characterizes the set containing the streaming server the client agent is initially connecting to. The secondary entry characterizes the set containing an alternate server of the client agent. The selected (primary) streaming server then starts the transmission of the multimedia stream to the client agent 1.8. According to the present invention, the streaming servers (1.5, 1.6) can be dynamically switched in response to a client 1.8 detecting a streaming server failure.

Figure 1B:
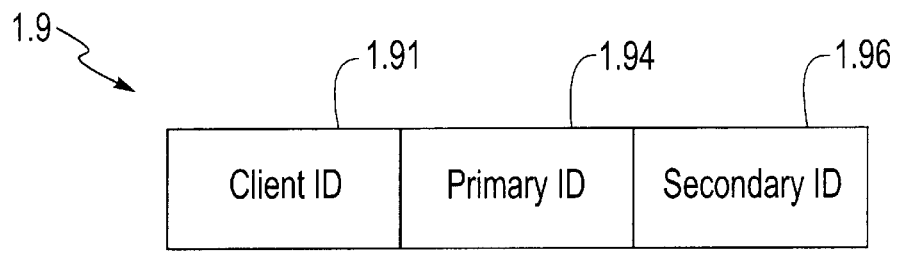

FIG. 1b depicts an example of a data structure 1.9 which can be used to record the relationship between the client 1.8 and the streaming servers. As depicted, the structure 1.9 includes a client ID 1.91 which identifies a client 1.8; a primary ID 1.94 which identifies a primary server 1.2 for serving the multimedia stream to the client 1.8; and a secondary ID 1.96 which identifies a secondary set of servers 1.6 which includes a secondary server 1.3 capable of serving this client in the event a failure is detected in the stream or the primary server 1.2. In a preferred embodiment, the data structure is maintained at the clients, to reduce the overhead on the control server 1.1.

To illustrate an example of how the client-based dynamic switching mechanism works, assume without loss of generality that the client agent 1.8 is assigned a primary streaming server 1.2 that is using an even-numbered port 1.92. The primary ID 1.94 and secondary ID 1.96 could be communicated to the client 1.8 and stored in the data structure 1.9 at the client. When the client 1.8 detects a failure in the stream or the primary streaming server, the client agent communicates again, for example passing the primary ID 1.92 and/or the secondary ID 1.96 to the control server 1.1, requesting (based on the secondary ID 1.96) an alternate streaming server 1.3 that is using an odd-numbered port 1.93. The control server 1.1 then switches the client agent to an alternate streaming server 1.3 in the set 1.6 of streaming servers using odd-numbered ports 1.93. The selected secondary streaming server now becomes the primary streaming server for the client agent 1.8, and the set 1.5 that contains streaming servers using even-numbered ports becomes the set for the secondary server. The control server 1.1 preferably communicates the updated identifiers (1.94, 1.96) to the client 1.8. This feature allows the client to dynamically switch back and forth between the two sets.

In one embodiment, the multimedia stream is broadcast over the Internet and the client 1.8 is a conventional computer workstation equipped with a standard browser having an appropriate plug-in for the streamed video file format. Alternately, the browser is JAVA (a trademark of SUN MicroSystems) compatible, or uses other platform-specific technology, such as ACTIVEX (a trademark of Microsoft), so that a plug-in is not needed.

Given this streaming server organization, the client agent 1.8 can be guaranteed an alternate streaming server that is not the same as the primary streaming server during the switching process. As described above, the streaming servers are divided into two disjoint sets, say A and B. Without loss of generality, assume that streaming servers in set A are serving the data from even-numbered ports 1.92 and those in set B from odd-numbered ports 1.93, respectively. Furthermore, assume that a particular client agent 1.8 is initially assigned to a streaming server a in set A. When server a fails, the client 1.8 will request the control server 1.1 for a new (alternate) streaming server using an odd-numbered port 1. 93, and the control server 1. I will assign it a streaming server b that is in the set B. However, given that the two sets are disjoint, it follows that the alternate streaming server must be different from the primary streaming server. The converse is true, if the client is initially connected to a streaming server b' in set B but requests to be switched to an alternate streaming server, it will be reconnected to a streaming server a' that is guaranteed to be different from b'.

Those skilled in the art will appreciate that the client-based method and system of the present invention can also be applied to a single set or cluster of servers wherein the control server 1.1 and streaming servers (1.2, 1.3) are appropriately configured. For example, the control server 1.1 could be coupled to a single set of streaming servers 1.5 which includes two steaming servers (1.2 and 1.3). One streaming server 1.2 could be using an even port 1.92 and the other streaming server 1.3 could be using an odd port 1.93. The control server assigns different identifiers to the streaming servers for delivering the multimedia data. Each of the streaming servers uses the identifier for transmitting the real-time multimedia streams. Each client agent receives the multimedia stream from a streaming server, performs the appropriate processing (e.g., decompression, scaling) on the stream and renders the multimedia output. Each client agent 1.8 can be provided with a primary and an alternate server identifier. The primary entry characterizes the streaming server the client agent is initially assigned and connecting to. The secondary entry characterizes the alternate server of the client agent. When the client 1.8 detects a streaming server failure or overload, the control server 1.1 redirects the client to the alternate streaming server. Thus, the client 1.8 can continue to receive the multimedia streams with minimal or no interruption and be guaranteed an alternate streaming server that is not the same as the primary streaming server as a result of the switching process.

Figure 2A:
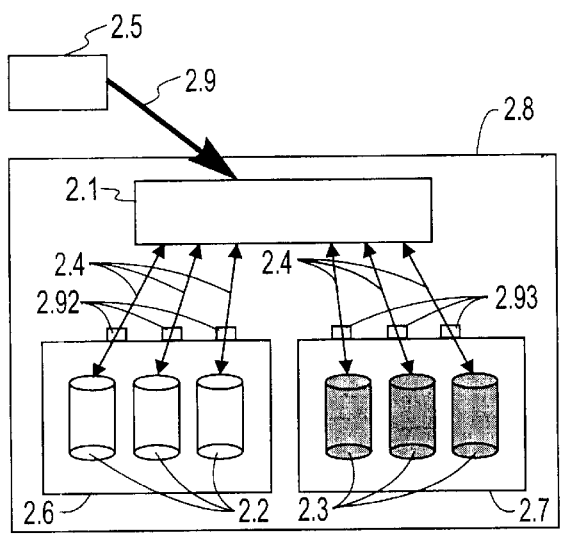
FIGS. 2(a), 2(b), and 2(c) depict an example in block diagram form of a client agent requesting a multimedia stream from the streaming servers.
Figure 2B:
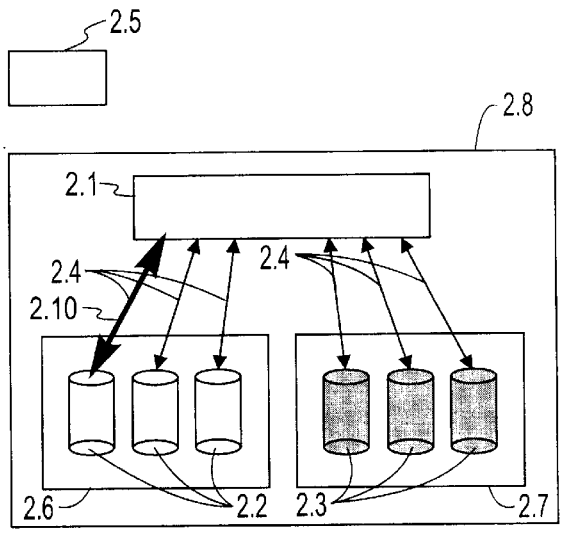
Figure 2C:
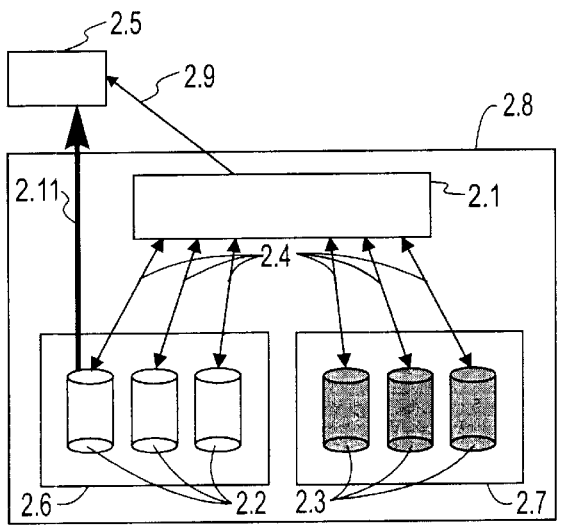

FIGS. 2(a)–(c) depict an example of a process in a system wherein a client agent can request a multimedia stream from the streaming servers. As depicted, the system includes a server architecture 2.8, and a client 2.5. The server 2.8 includes a control server 2.1 and a set 2.6 of streaming servers 2.2 that are using even-numbered ports 2.92 and a set 2.7 of streaming servers 2.3 that are using odd-numbered ports 2.93. The control server and the streaming servers communicate via communication channels 2.4.

In FIG. 2(a), the client agent 2.5 requests a multimedia stream by establishing a connection 2.9 to the control server 2.1 managing the multimedia stream. The control server 2.1 then assigns and redirects the Client Agent's request to one of the sets (2.6, 2.7) of streaming servers and also to a particular (primary) server within a set, based on some load-balancing heuristics. For example, the control server may redirect the request to a streaming server based on the current number of connection streams to each streaming server. The control server 2.1 also assigns an alternate server to the requesting Client 2.5.

For example, as depicted in FIG. 2(b), the control server 2.1 has redirected the client agent 2.5 to the streaming server indicated by the link 2.10. As depicted in FIG. 2(c), the selected streaming server (2.10, 2.2) then begins delivering the multimedia stream to the client agent 2.5, over the link 2.11. The control server 2.1 can provide a primary and alternate streaming server identifier 1.96 to the requesting client 2.5 or the server 2.1 can maintain that information at the server 2.1.

Figure 3A:
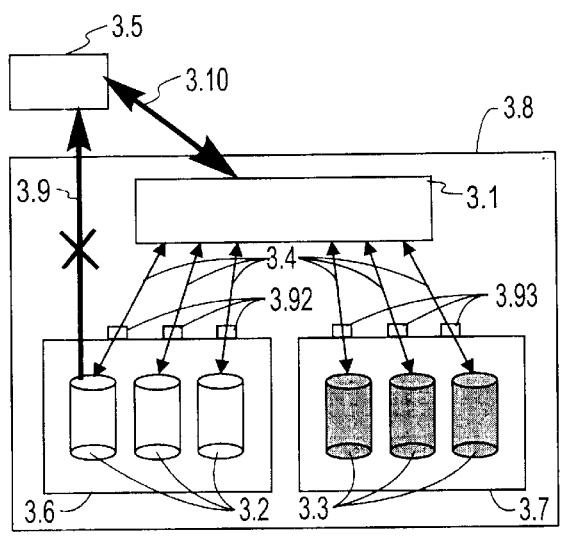
FIGS. 3(a), 3(b), and 3(c) depict an example in block diagram form of the dynamic server switching process for the client agent when the primary server for the client agent fails.
Figure 3B:
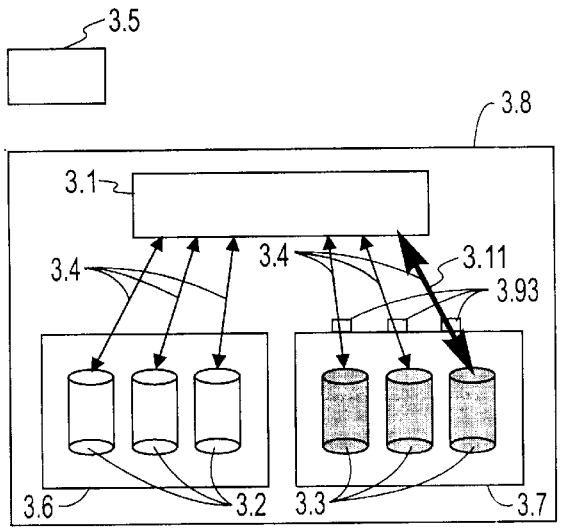
Figure 3C:
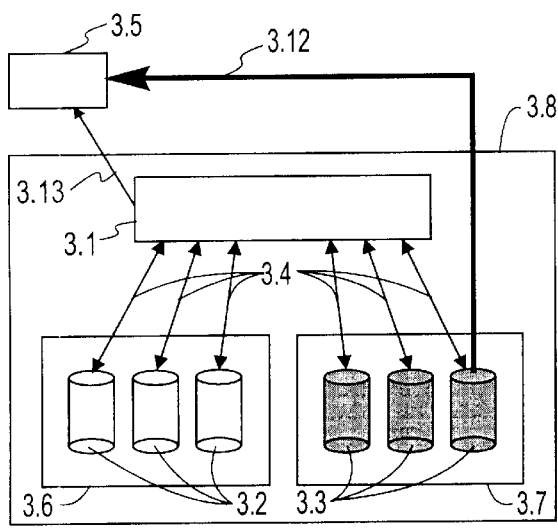

FIGS. 3(a)–(c) depict an example of a client-based dynamic streaming server switching process in accordance with the present invention. As depicted, the system includes a server architecture 3.8 and a client agent 3.5. The server architecture includes a control server 3.1 and a plurality of streaming servers (3.2, 3.3). One set 3.6 of servers 3.2 are using even-numbered ports 3.92 and another set 3.7 of servers 3.3 are using odd-numbered ports 3.93. Communication channels 3.4 link the control server 3.1 and the streaming servers.

In FIG. 3(*a*), an original connection 3.9, assigned by the control server 3.1 to deliver the multimedia stream from a primary streaming server 3.2 to the client agent 3.5 fails. The failure may be detected by using any known method. For example, the client agent 3.5 may monitor the effective bit rate of the stream. If the bit rate falls below a given threshold, the connection to the server 3.2 can be considered to have failed. As a result of this failure, the client agent 3.5 can send a message 3.10 to the control server 3.1, requesting to be switched to an alternate server. Referring now to FIG. 3(*b*), the control server 3.1 then redirects 3.1 1 the Client Agent's multimedia stream request to an alternate server 3.3 in the set of streaming servers 3.7 that is using odd-numbered ports 3.93, in response to the client's switch request. Referring now to FIG. 3(*c*), the selected alternate server 3.7 starts streaming data to the client agent over the Link 3.12 with minimal or no disruption.

A preferred embodiment of the present invention includes features implemented as software tangibly embodied on a computer program product or program storage device for execution on a processor (not shown) provided with the client (1.8, 2.5, 3.5), the control server (1.1, 2.1, 3.1) and/or the streaming servers (1.2, 1.3, 2.2, 2.3, 3.2, 3.3). For example, software implemented in a popular object-oriented computer executable code such as JAVA provides portability across different platforms. Those skilled in the art will appreciate that other procedure-oriented or object-oriented (OO) programming environments, including but not limited to $C^{++}$ and ACTIVEX, can also be employed.

Those skilled in the art will also appreciate that the software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the clients or servers could be accessed and maintained directly via disk (not shown), the network, another server, or could be distributed across a plurality of servers.

Figure 4:
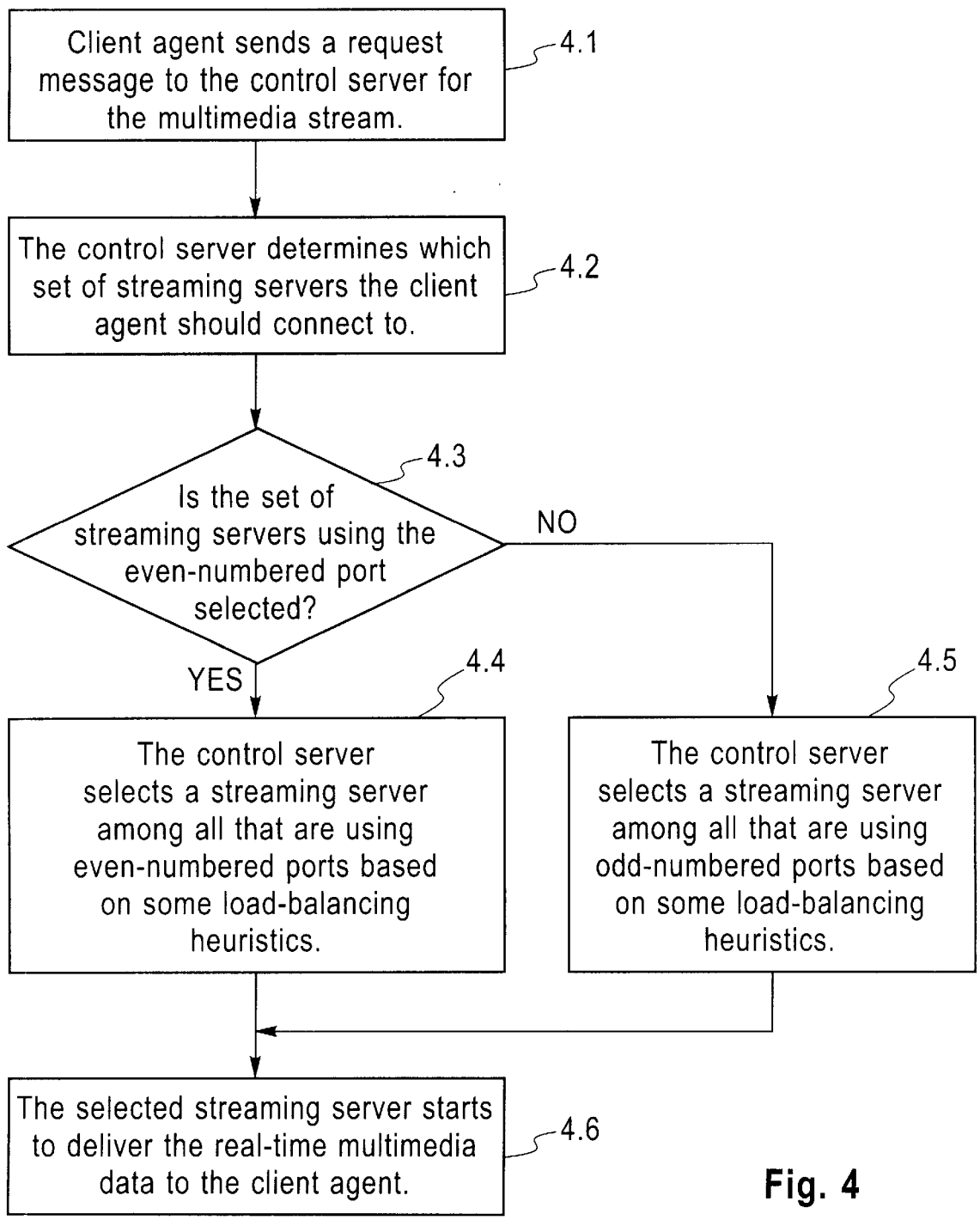
FIG. 4 depicts an example of a method having features of the present invention for streaming continuous real-time MM data to a client.

FIG. 4 depicts an example of a method having features of the present invention for streaming continuous real-time data streams to a client. As depicted, (with reference to FIG. 2) in step 4.1, a client 1.1 sends a request for a multimedia (MM) stream to the control server. The streaming servers (SS) (2.2, 2.3) have been divided into at least two non-overlapping sets where each set includes at least one SS. In step 4.2, the control server identifies a set of primary 2.6 (and alternate 2.7) streaming servers that the client 2.5 can connect to. In steps 4.3–4.5, depending on the set selected as primary, the control server selects a primary SS from the set. The control server can optionally select the SS 2.2 from a plurality of SSs in the selected set 2.6 using conventional load-balancing techniques. In step 4.6, the selected SS begins streaming 2.11 a continuous real-time MM data to the client 2.5. In this example, the control server 2.1 also communicates 2.12 an identifier of the primary and alternate streaming servers to the client 2.5.

Figure 5:
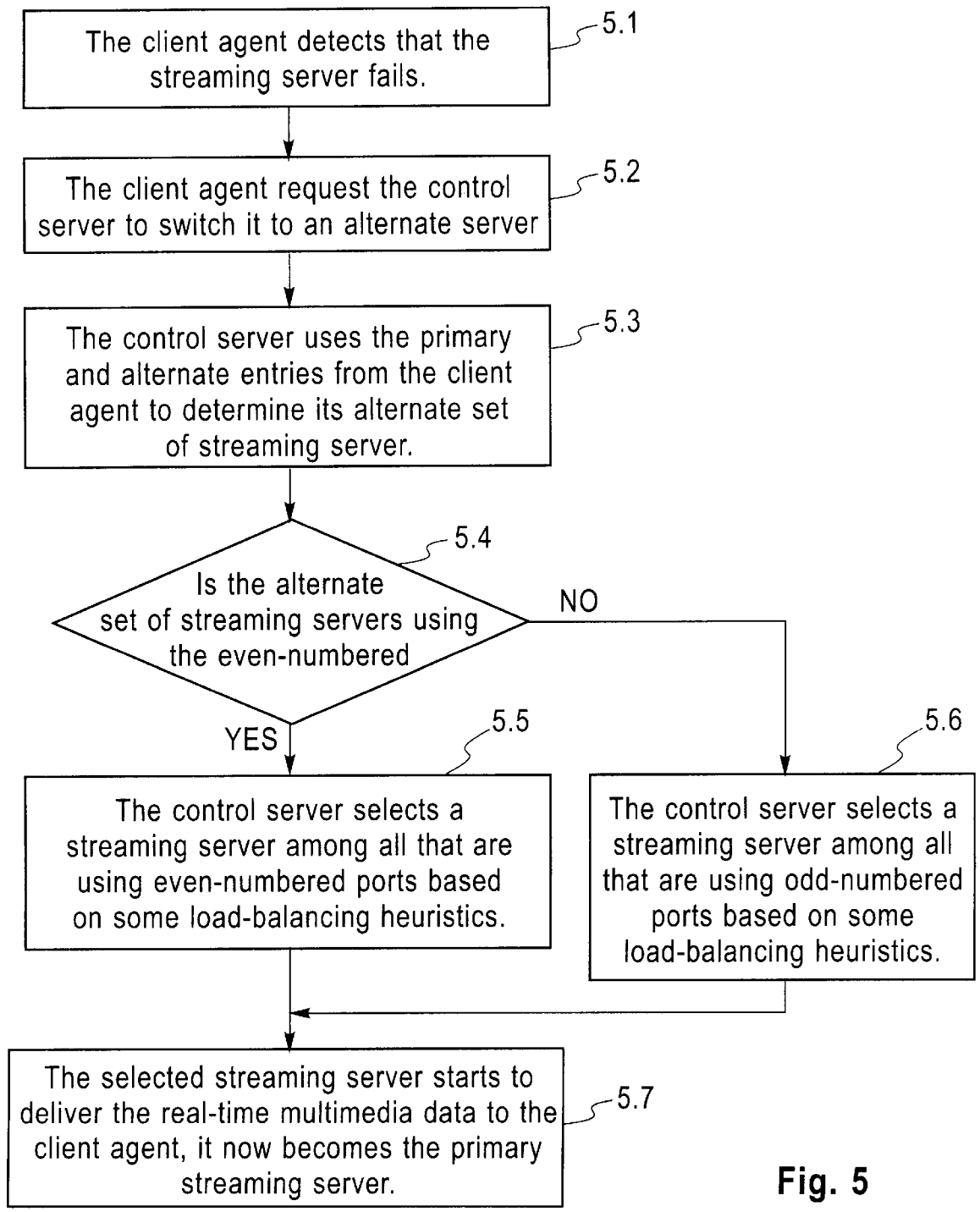
FIG. 5 depicts an example of a method having features of the present invention for switching clients among multiple servers if a streaming server becomes overloaded or fails.

FIG. 5 depicts an example of a method having features of the present invention for automatically and gracefully switching clients among multiple streaming servers in the event that a streaming server (SS) (3.2, 3.3, FIG. 3) becomes overloaded or fails. In this example, the client 3.5 is receiving a continuous multimedia stream and the switching must be transparent to the client and maintain uninterrupted playback of the multimedia streams. As depicted, in step 5.1, the client 3.5 detects a failure. By way of example only, the determination can be made based on: the received bit or frame rate (for video); a bit rate or sample rate (for audio); monitoring the delivery rate and/or for packets arriving out of order: for example using packet numbering mechanisms available in TCP; sequence numbering or time stamp capabilities of RTP (in combination with the User Datagram Protocol (UDP)). For example, RTP includes a field allowing the use of time stamps or sequence numbers. In any case, the determination could be based on the rate measurement or monitoring mechanism falling below (or exceeding) some threshold. Alternatively, the primary SS 3.2 or the control server 3.1 could send an explicit distress or switch signal to the client. An explicit signal can be used for example to switch clients in phases with minimal disruption. An additional alternative is to provide users with an explicit way to send a switch request to the control server based on their subjective evaluation of the output. This could be accomplished by one skilled in the art by equipping the client's user interface (for example the browser or remote control) with a button (or other graphical or speech driven means) that would initiate a switch request. In step 5.2, when a failure, distress or switch signal is detected by the client 3.5, the client communicates a request to the control server to automatically switch to the alternate server. In step 5.3, the control server 3.1 uses the primary and alternate entries for the client agent to determine the appropriate alternate set of streaming servers. The primary 1.94 and secondary identifiers 1.96 could be provided by the client (assuming they were originally communicated to the client) to the control server with the switch request. Alternatively, the control server could manage the identifiers 1.9 for its clients. In step 5.4, the control server identifies the servers associated with the alternative set for this client (for example those using even-numbered ports). In steps 5.5 and 5.6 the control server selects a server from the set of alternate streaming servers, e.g., based on some load balancing heuristics. In step 5.7, the selected alternate streaming server 3.7 begins to provide the client with the real-time multimedia streams and the alternate SS becomes the new primary SS. The original (or another) streaming server is selected as the new alternate SS for the client.

Those skilled in the art will appreciate that the client could be enhanced within the spirit and scope of the present invention to further assist in the secondary server selection process. For example, when a client 1.1 sends a request for a multimedia (MM) stream to the control server, the server could download code (for example by means of an applet) including stream or system configuration dependent rules which would enhance the client's selection process based on the nature of the failure. The client could for example determine a delivery rate based on the difference between a server's time stamp and the time a packet is delivered to the client. If the delivery rate falls below a threshold this could be determined to be a network failure (or server congestion) for which the downloaded rules indicate a certain secondary server set preference.

Those skilled in the art will appreciate that although a preferred embodiment is described in terms of the TCP/IP suite of protocols, the present invention can be applied to any packet-based data delivery system. A packet refers to a unit of information transmitted as a whole from one device to another on a network. In packet switching networks, a packet typically has a fixed maximum size and includes both data and a header including an identification number, source and destination addresses and sometimes error control data. Information is disassembled into packets before routing. Each packet may travel along a different route and arrive at their destination at different times or out of sequence and the receiving computer reassembles the original information. Standards for packet switching on networks are documented in CCIT recommendation X.25.

Streaming Data on the Internet and World Wide Web

Today's computer-network infrastructures, including the Internet, were not designed with data streaming in mind. Streaming media requires that data be transmitted from a server to a client at a sustained bit-rate, high enough to maintain continuous and smooth playback at the receiving client-station.

The World Wide Web (WWW) has become a primary means of disseminating information. Initially, the type of information distributed was mostly in the form of text and graphics. Later, images and stored audio and video files emerged. These audio and video files are downloaded from a server and stored at the client before they are played. More recently, streamed audio and video has become available from both stored and live sources on the Web. Audio and video streaming enables clients to select and receive audio and video content from servers across the network and to begin hearing and seeing the content as soon as the first few bytes of the stream arrive at the client. Streaming technology involves a combination of audio and video compression, stream formatting and transmission packetization schemes, networking protocols and routing, client designs for displaying and synchronizing different media streams, and server designs for content storage and delivery.

An example of a method and apparatus for transmission of video image data over an internet network, which can include an ordinary telephone network, is described in co-pending US patent application Ser. No. 08/697,652 now U.S. Pat. No. 5,793,895, entitled "Intelligent Error Resilient Video Encoder" (IBM Docket No. YO996-165), by Y. Chang, Z.-Y. Shae and M. Willebeek-LeMair ("Chang et al.,").

The Chang et al., patent application is commonly assigned with the present invention and is hereby incorporated by reference herein in its entirety. Chang et al., increases the error resilience of a compressed data stream that is transmitted over a low bit rate network and provides for fast recovery from packet losses in a congested network environment. In particular, Chang et al., provides for a method of compressing data to improve its tolerance to error. The actual video encoders can use H.263, H.261, or other well known video compression algorithms. Data is divided into a number of frames, where each of the frames is divided into macroblocks. Each macroblock is then assigned a dependency count, where the count is a measure of the dependency of macroblocks in subsequent frames. If the dependency count of the blocks exceeds a selected threshold, then intra-coding of the block is applied. If the dependency count of the block does not exceed the threshold, then inter-coding is applied to the block. With intra-coding, the data in the block is compressed with no dependence on any other blocks, while with inter-coding, the macroblock is compressed as a difference to other blocks.

An example of a media-streaming system—adaptable to the present invention—and capable of delivering audio and video over low-bandwidth modem connections using standard compression technologies is available from the IBM Corporation under the trademark BAMBA. BAMBA is currently available from the IBM Corporation. BAMBA offers high-quality audio and video over low-bit-rate connections and can operate using a standard Hyper Text Transfer Protocol (HTTP) server. A BAMBA video is enhanced with special provisions for reducing the effect of errors in a lossy-network environment. BAMBA adheres to existing standards wherever possible. BAMBA enables the streaming of audio and video across the Web through very-low-bit-rate connections; audio is sufficiently compressed to stream over 14.4 Kb/s- and video over 28.8 Kb/s- modem connections.

BAMBA not only achieves the low-bit-rate goal, but can also be extended to support higher-bit-rate streams to provide higher-quality streaming over intranets or higher-bandwidth Internet connections. Furthermore, when streaming is not possible, because of congestion or insufficient bandwidth availability, the BAMBA player (client software) at the receiving client automatically calculates how much data to pre-load in order to maintain continuous playback. This allows clients connected via low-bit-rate connections to fall back to a download-and-play mode and still receive the higher-bit-rate content.

The present invention provides a mechanism which enables a client agent of streaming applications to continue receiving data from an alternate server with minimal disruption, for example if the primary server fails. A conventional scalable server architecture such as a router capable of routing and preferably load balancing requests among a set (or "cluster") of TCP-based servers can be used in one embodiment of the present invention. This mechanism is preferably fault-tolerant and suitable for large-scale audio and/or video distribution applications where multiple servers are available for delivering the streaming data. One immediate application is to implement this dynamic client-based server switching scheme in a live broadcast application that uses TCP connection router logic as part of the control server 1.1 together with live audio and video streaming technology. An example of this streaming technology is BAMBA, which includes streaming audio and video players designed to provide high quality audio and high frame-rate video from a live source over low-bandwidth connections.

Figure 3D:
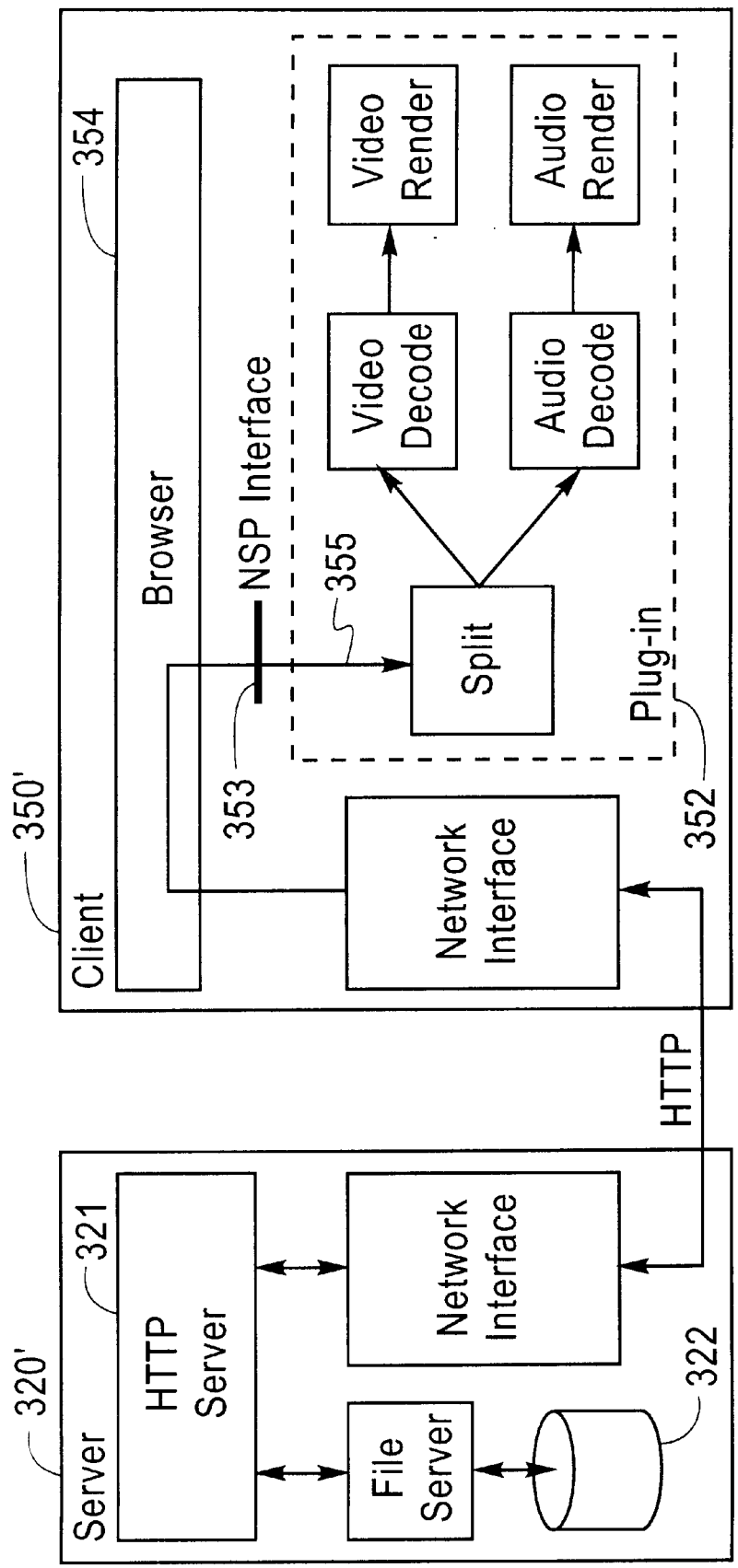
FIG. 3d depicts a more detailed example of the client-server architecture of FIGS. 3(a)–(c), adaptable to the present invention.

FIG. 3d depicts a more detailed example of the client-server architecture of FIG. 3a adaptable to the present invention. As depicted, the system includes a client 350' and a server 320'. The server 320' includes standard HTTP Web server logic 321, and one or more multimedia streaming files, such as BAMBA audio and video files, stored in memory 322. The client 350' is a conventional computer which includes a standard Web browser (such as is available from Netscape under the trademark NAVIGATOR or from Microsoft under the trademark INTERNET EXPLORER) and the BAMBA audio and video plug-in software 352.

The BAMBA plug-ins 352 are implemented as a set of conventional dynamic link libraries (DLLs) that interface to the Web browser 354 through the Netscape-defined plug-in API (NSP Interface 353). Those skilled in the art will appreciate that Netscape has defined a set of plug-in routines which are used to communicate between the plug-in 352 and the browser 354. Each plug-in library contains an initialization routine within which is identified the Netscape plug-in routines to be used by the plug-in. These routines include mechanisms to create and delete instances of a plug-in, manage the plug-in display window, control the flow of data streams to the plug-in, etc. In general, the plug-in is tightly integrated with the browser. Note that while Netscape was used in this example, the approach is similar for other browsers.

As is conventional, the BAMBA files may be embedded in HyperText Markup Language (HTML) pages by means of a URL pointing to file on the HTTP 321 or video server. When the URL is requested, the server 320' passes the metadata identifying the BAMBA file and containing information about the file type to the client 350'. The file type is used by the browser 354 to launch the appropriate plug-in 352 to playback the BAMBA file.

By way of example only, it is assumed that video and/or audio clips are streamed from standard HTTP Web servers 321 without special streaming software on the server and as can use the standard communication mechanisms provided by the HTTP protocol. This approach has certain advantages, the greatest of which is that it is simple and maps gracefully into the existing Web browsing architecture. As a result, content creators can easily produce audio and video clips and embed them in standard HTML pages, which are then loaded onto and accessed from a standard HTTP server 321. Since the underlying transport protocol used by HTTP is TCP/IP, which provides reliable end-to-end network connections, no special provisions are required for handling packet loss within the network. In essence, the audio or video clip can be treated like any other conventional HTTP object such as an HTML or GIF format file. If selected, the clip is transferred to the client/browser as fast as TCP/IP can move it and the client 350' begins decoding and rendering the file as soon as the first few bytes arrive.

Since TCP/IP is used as the underlying communication protocol, the streams can traverse firewalls without any special configuration requirements. In general, systems that are based on UDP/IP cannot traverse firewalls without explicit permission changes in the firewall which would allow passage to the UDP/IP packets. This is because UDP/IP packets are easier to imitate than TCP/IP packets, since the UDP/IP protocol involves no end-to-end handshakes or sequence numbers (see e.g., W. R. Cheswick and S. M. Bellovin, "Firewalls and Internet Security," Addison-Wesley, 1994).

The audio and video technology used can be based on standard algorithms originally defined within the ITU H.324 standard for video telephony over regular phone lines (see e.g., "Terminal for Low Bitrate Multimedia Communications" ITU-T Recommendation H.324, 1995). The audio standard, G.723, specifies two bit rates: 5.3 Kbps and 6.3 Kb/s (see e.g., "Dual Rate Speech Coder for Multimedia Communications Transmitting at 5.3 and 6.3 Kbit/s", ITU-T Recommendation G.723, 1996).

Returning again to FIG. 3d, a simple framing technique for smooth playback can be implemented wherein the audio and video are interleaved into a single file to simplify the server 320' function. Essentially, the server can treat the multimedia file as any other data file. The audio and video data is interleaved proportionately to maintain a synchronous rendering of both streams 355 at the client 350'. For example, the frames can consist of a 240-byte segment of audio and a 240 b/a-byte segment of video, where a is the audio rate and b is the video rate.

When the Web is accessed, the actual connection speed between a client 350' and a server 320' in the network varies, depending on the access method (e.g., modem or LAN), the network load, the server load, and even the client load. Hence, it is rarely possible to guarantee performance in this "best-effort" environment, where processing and bandwidth resources are typically evenly distributed among all competing applications. Consequently, when an audio/video clip is accessed over the network, there is no guarantee that the resources (bandwidth and processing) are available to render the clip smoothly. To handle this situation, BAMBA has a built-in rate monitor that dynamically evaluates the effective data-transfer rate (r) of a selected audio/video clip and compares this to the specified bit-rate (a+b) for the clip, which is contained in the clip header. If the specified rate is less than the measured rate, the clip can be rendered immediately. If, on the other hand, the specified rate exceeds the measured rate (a+b>r), then a fraction of the clip is buffered sufficient for the clip to play to completion smoothly once rendering is started. The amount of pre-buffering is d=L (1−r/(a+b)), where L is the clip length. This calculation is performed based on the initial download rate and again anytime the buffer underflows.

Referring now to FIGS. 3(a)–(c) and 3d, according to the present invention, the plug-in 352 includes logic for the client 350' to detect that the streaming server 320' has failed, and in response communicate a switch request to the control server 3.1 to automatically switch the client 350' to another server in an alternate set of servers 3.7 available to the client. By way of example only, the determination can be made based on: the effective bit or frame rate (for video); a bit rate or sample rate (for audio); monitoring the delivery rate or for packets arriving out of order: for example using packet numbering mechanisms available in TCP; sequence numbering or time stamp capabilities of RTP (in combination with the User Datagram Protocol (UDP)). For example RTP includes a field allowing the use of time stamps or sequence numbers. In any case, the determination could be based on the effective rate measurement or monitoring mechanism falling below (or exceeding) some threshold. Alternately, the primary server 320' or the control server 3.1 could send an explicit distress or switch signal to the client 350'. An explicit signal can be used for example to switch clients in phases with minimal disruption. In this case, when a failure, distress or switch signal is detected by the client 350', the client communicates a request to the control server to automatically switch to the alternate server. The control server 3.1 can use the primary and alternate entries from the client 350' to determine an appropriate alternate set of streaming servers. The primary and secondary identifiers could be provided by the client 350' (assuming they were originally communicated to the client) to the control server 3.1 with the switch request. Alternatively, the control server 3.1 could manage the identifiers for its clients 350'. Next, the control server 3.1 identifies the servers associated with the alternative set for this client (for example those using even-numbered ports) and selects a server from the set of alternate streaming servers, e.g., based on some load balancing heuristics. The selected alternate streaming server 3.7 then begins to provide the client with the real-time multimedia streams. Finally, the alternate server becomes the new primary server and the original server 320' (or another) streaming server is selected as the new alternate server for the client 350'.

Figure 6:
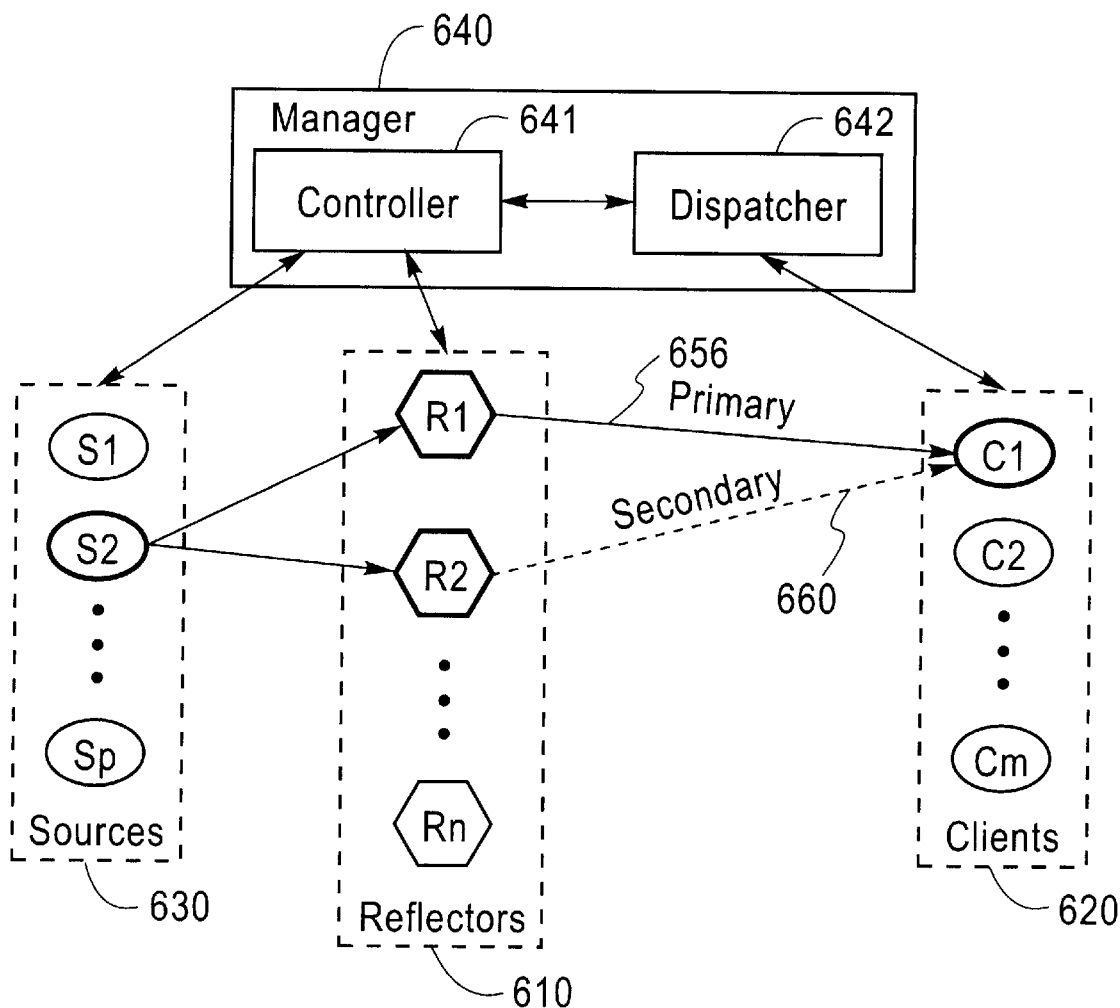
FIG. 6 depicts another example of an architecture having features of the present invention.

FIG. 6 depicts another example of an architecture having features of the present invention. As depicted, this sample application includes: a manager 640 with a controller 641 and dispatcher 642 subsystem; a plurality of reflectors 610 grouped into primary and secondary (tertiary, etc.) sets R1 . . . Rn; one or more client playback stations 620; one or more multimedia source capture stations 630; and a control server 640. The manager component 640 configures the system. Within the manager, the controller 641 assigns reflectors 610 to sets (R1, R2, . . . Rn) and sources 630 to reflectors. The dispatcher 642 assigns primary and secondary reflectors to a client based on the desired source they request to receive and on the system load characteristics. A multimedia source capture station S2 generates the audio and video data and delivers the stream to the reflectors 610. The reflectors 610 receive the audio and video data, and provide scalability by replicating the stream and delivering it to the client playback station C1. The client playback station C1 receives the stream and decodes the audio/video for the human user.

Figure 7:
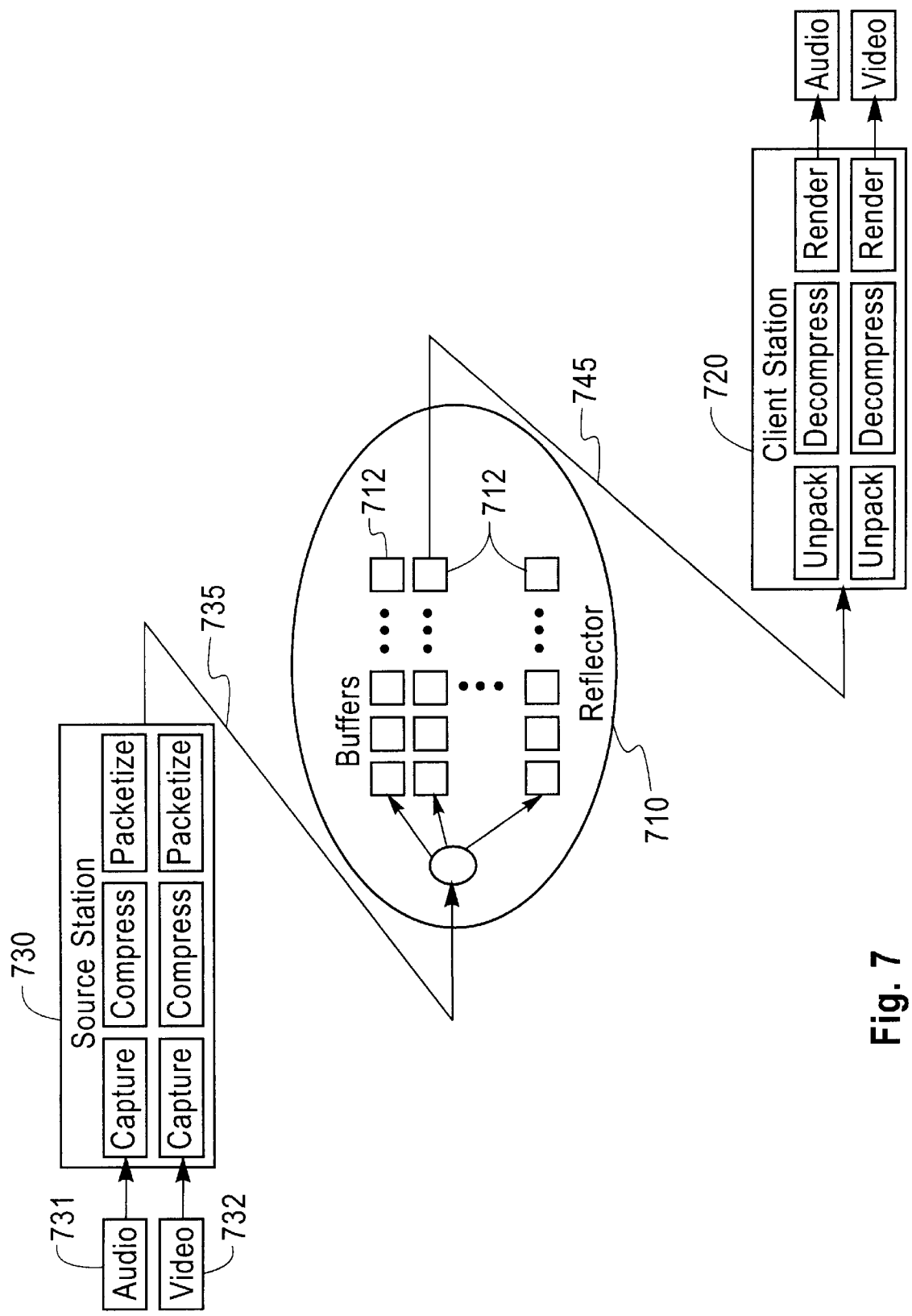
FIG. 7 depicts a more detailed example of the source, client and reflector depicted in FIG. 6.

FIG. 7 depicts a more detailed example of the source, client and reflector depicted in FIG. 6. As depicted, the source (also called "capture") station 730, audio and video inputs are captured/converted from analog to digital form, compressed, and then packetized using conventional techniques. The packets are transmitted to the reflector 710 via a TCP/IP connection 735 that is established between the reflector 710 and the capture station 730. The reflector 710 then establishes and manages one or more connections 745 to interested clients (also called "playback stations"). These connections are initiated by the playback stations 720, which can either establish a direct connection to the reflector given the correct IP address, or establish a connection indirectly via a Web server (not shown) through a HTTP URL, which returns a file to the playback station 720 containing the appropriate address information and MIME type. The reflector 710 distributes the audio and video streams to the various playback stations 720 in the network. Playback stations may join an ongoing session (live broadcast in progress) at any point in the transmission. The reflector preferably maintains a circular buffer queue 712 containing the most recent several seconds of a live transmission for each playback station 720 to which it is connected. When a new station connects, the reflector produces a new copy of the circular buffer queue 712 for that connection. Each of the circular buffers is written to by the incoming capture station input 735 and read from by the TCP/IP connection 745 to the corresponding playback station. The TCP/IP approach allows the connections to easily traverse firewalls and maintain high quality.

Those skilled in the art will appreciate that the same physical reflector node can be used for multiple sessions. The reflector node resource is limited, but upper bounds can be set for the number of connections per session as well as for the total number of connections per reflector. Furthermore, the reflectors may be cascaded to scale and handle increased demand. A reflector may also be configured to provide multicast services when it is connected to networks with multicast capability (for example a multicast backbone (MBONE)). For example, point-to-point TCP/IP connections may be established between reflectors through firewall boundaries that separate intranets from the global Internet. Within the intranets, the reflector may establish multicast UDP/IP connections to local playback stations.

Figure 8:
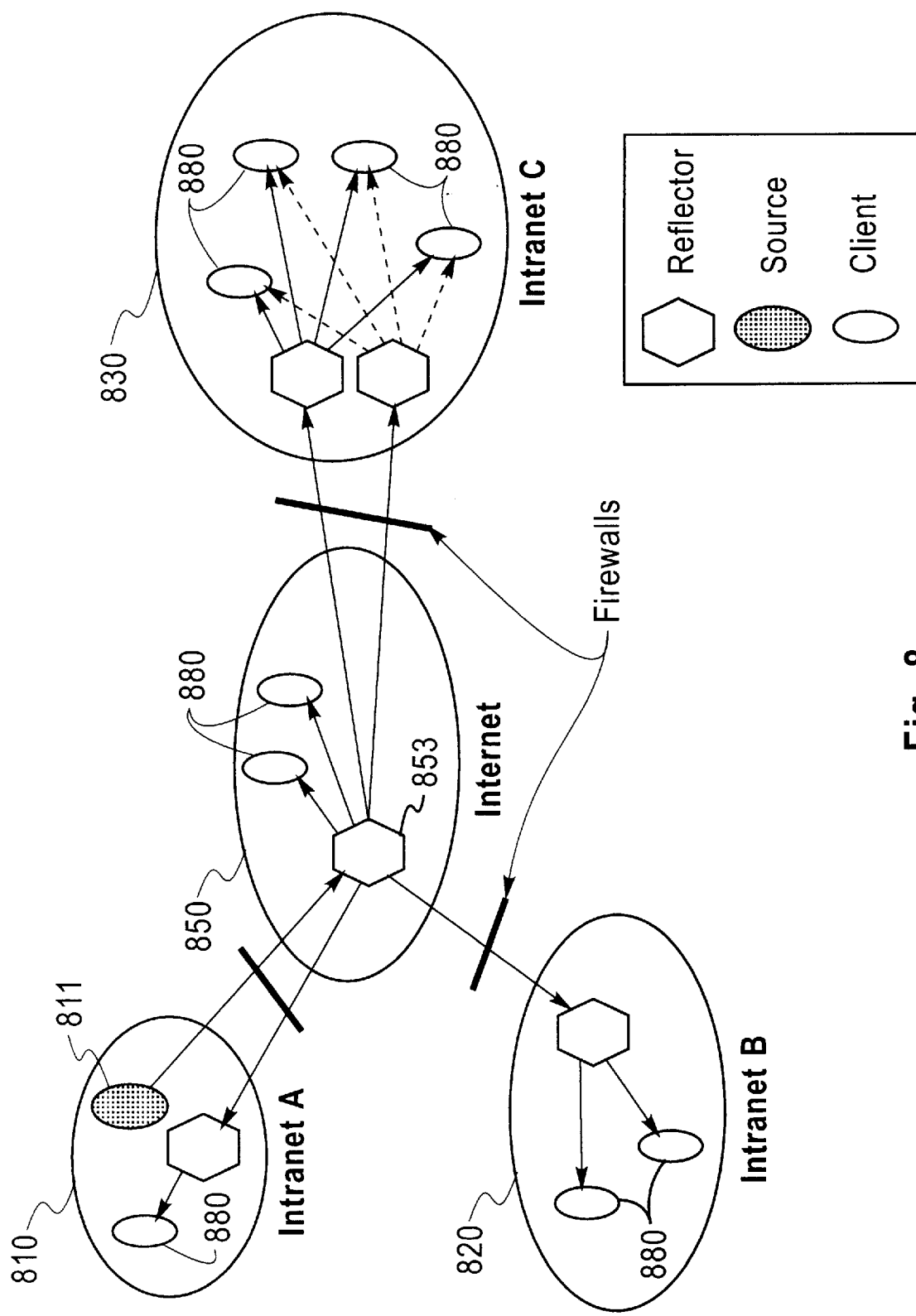
FIG. 8 depicts an example of a hierarchical reflector configuration.

FIG. 8 depicts an example of a hierarchical reflector configuration. As depicted, a capture station 811 in intranet A 810 is transmitting to a 'root' reflector 853 in the Internet 850, which in turn is forwarding the signal to reflectors within different intranets 810–830. Within each intranet, the signal is multicast to local playback stations 880. Modifications to the streams could be made locally at each reflector.

Referring again to FIG. 6, the control server 640 is responsible for handling the entrance and departures of multimedia source and reflectors into the application. It preferably also monitors the workload of the reflectors 610 and uses the workload-related heuristics for its client admission process. A TCP Connection Router can be implemented within the control server 640 to control client admission as well as to choose and dispatch primary and secondary (also called "alternate") servers for and to the client 620.

The reflectors 610 in this example are separated into two sets R1, R2, by their port numbers. When the client playback station C1 first connects to the control server 640 requesting a live audio/video session, the TCP Connection Router will use heuristics on workload distribution to assign a reflector in one of the sets to the client playback station. The client playback station also receives the primary 650 and secondary 660 entries that characterize the two sets of reflectors. If the client C1 detects a failure of the primary server R1, the client playback station C1 sends a request to the control server 640 asking for a reflector with an alternate port number. Since, the alternate server is ensured to be different from the primary server, the client playback station can continue to receive the audio and video stream with minimal interruption.

Alternative Embodiments

Those skilled in the art will readily appreciate that equivalents, alternatives and/or extensions to the various embodiments can be used within the spirit and scope of the invention as claimed, including the following.

Those skilled in the art will appreciate that there are a large number of audio/video streaming systems available in the market today that are adaptable to and fall within the spirit and scope of the present invention (see e.g., G. Venditto, "Instant Video," Internet World, November 1996, pp. 84–101). These include products such as: VDOLIVE (available from VDOnet Corp.); STREAMWORKS X PLAYER (available from Xing technology Corp.); and those available from Vosaic LLC InterVU Inc.; and REALAUDIO AND REALVIDEO (available from RealNetworks Inc., VDOLIVE, STREAMWORKS, Vosaic, and RealNetworks' products are based on proprietary client-server systems. Some systems transport their audio and/video streams using User Datagram Protocol (UDP/IP) connections. This unreliable transport does not retransmit lost packets and is blocked by most firewalls unless they are specially reconfigured. Other systems use TCP/IP or HTTP (based on TCP/IP). Some products are based on Motion Picture Expert Group (MPEG) standards, while others uses the H.263 standard. In general, these systems are designed to work over higher-bandwidth LAN connections and not at modem speeds. At modem speeds, the MPEG-based systems revert to slide-show-type video.

According to a preferred embodiment of the present invention, the streaming servers are separated into two disjoint non-empty sets according to whether the port numbers they use are even or odd. The set of streaming servers using odd-numbered ports are grouped into one set, and the set of streaming servers using even-numbered ports are grouped into the other set. In a first generalization, this invention can use any mechanisms that separate the streaming servers into two disjoint sets using their port numbers. This is defined by a function F for the server. As in the preferred embodiment, the sets created by the mechanisms in this generalization are preferably mutually exclusive. Also, both of the sets must also contain at least one functioning streaming server. As an example of this first generalization, two non-overlapping ranges of port numbers can be used to separate the streaming servers, such as 7000–7100 and 7200–7300. All streaming servers using port numbers within the range of 7000–7100 are grouped into one set, and all the streaming servers using port numbers within the range of 7200–7300 are grouped into the other set.

A second generalization of the preferred embodiment relates to the placement of the primary 1.94 and secondary identifiers 1.96 that are used by the client agent to distinguish the sets of streaming servers. This generalization allows these entries to be located in other entities in the system described in this invention. For example, the primary and secondary entries for a client agent can be located at the control server 640. When a primary streaming server R1 fails, the affected Client Agents C1 notify the control server 640 and request to switch servers. The control server 640 can redirect the clients to a streaming server in the secondary set R2, based on their respective secondary entries. As another example, the secondary entry for a client agent can be allocated 660 at the same time as the primary 650 entry. In this case, upon detecting a failure, the client agent can directly access the second Streaming Set R2, without communicating with the control server.

Those skilled in the art will also appreciate that the present invention is not limited to conventional desktop computers and workstations and is applicable to and provides advantages for mobile, wireless and/or so-called low-end devices including but not limited to hand-held devices, personal digital assistants and video phones that can receive streaming data. Furthermore the invention can be applied to the rapidly converging traditional broadcast and data networks, via processor-based set-top boxes and Internet appliances, which can bring the web to any TV via a standard telephone connection. By way of example only, see the Internet appliance sold by WebTV Networks, Inc., under the trademark WEBTV.

Now that the invention has been described by way of a preferred embodiment, with alternatives, those skilled in the art will appreciate that other alternatives, improvements and equivalent methods and systems can be devised within the spirit and scope of the invention as claimed.

We claim:

1. In a client-server system, a method of dynamically switching client-server connections, said method comprising the steps of:
    dividing a plurality of servers into two or more disjoint sets, wherein each set of servers includes at least one server;
    a client requesting a real-time data stream;
    assigning the client to both a primary server in a first set of servers and a secondary set of servers, in response to said request;
    the client receiving the real-time data stream from the primary server;
    the client detecting a failure in one or more of the real-time data stream and the primary server; and
    the client dynamically switching to and receiving the real-time data stream from a secondary server in the secondary set of servers, in response to said detecting step.

2. The method of claim 1 wherein said dividing step further comprises the step of dividing the servers into said disjoint sets based on server port numbers.

3. The method of claim 2, further comprising the steps of:
    said dividing step comprising the step of grouping the servers into two sets wherein the first set includes a plurality of primary servers using odd port numbers and the second set includes a plurality of secondary servers using even port numbers.

4. The method of claim 1 wherein the system includes a control server coupled to the client and the sets of servers, and wherein said assigning step further comprises the steps of:
    said requesting step comprising the client communicating a message to the control server, requesting a connection to one of the servers; and
    the control server selecting the primary server and the secondary server for the client.

5. The method of claim 4, wherein said step of dynamically switching to the secondary server, further comprises the steps of:
    said step of dynamically switching comprising the steps of:
        client communicating a switch request to the control server;
        the control server assigning the secondary server to the client wherein the
        secondary server is member of a set different from the set of which the
        primary server is a member of; and
        establishing a new connection between the client and the secondary server.

6. The method of claim 1 wherein the data stream is a multimedia data stream.

7. The method of claim 6, wherein the multimedia data is one or more of live digital audio and video data.

8. The method of claim 1, wherein said step of the client detecting a failure, further comprises the steps of:
    monitoring the data stream for data arriving out of order; and
    comparing the order with a threshold.

9. The method of claim 8, wherein the data stream is communicated using a TCP/IP suite of protocols, said monitoring step further comprising the step of:
    monitoring based on a mechanism selected from the group consisting of: packet numbering mechanisms available in TCP, and sequence numbering or time stamp capabilities of a Real-time Transport Protocol in combination with a User Datagram Protocol.

10. The method of claim 1 wherein said each set of servers includes a plurality of servers and said assigning step further comprises the step of load-balancing client assignments to the primary server.

11. The method of claim 1, wherein said step of the client detecting a failure, further comprises the steps of:
    measuring one or more of a received bit rate; frame rate; delivery rate; and sample rate associated with the data stream; and
    comparing the rate with a threshold.

12. The method of claim 1, further comprising the steps of:
    the client communicating a switch request to a control server, in response to said step of detecting the failure; and
    the control server identifying the secondary server in the second set of servers based on entries maintained at a control server, in response to said detecting step.

13. The method of claim 1, further comprising the steps of:
    the control server communicating an identifier of the primary server and the secondary set of servers to the client, in response to the client requesting the data stream;

said step of the client dynamically switching comprising the step of the client communicating a request to the control server to switch to the alternate server including the identifier of the secondary set of servers; and the control server identifying the secondary server in the second set of servers in response to a client switch request.

14. The method of claim 1, wherein the system includes a control server coupled to the client and said each set of servers, further comprising the steps of:

one of the primary server and the control server communicating a switch signal to the client; and said step of the client dynamically switching comprising the step of the client communicating a request to the control server to switch to the alternate server, in response to the switch signal; and the control server identifying the secondary server in the second set of servers based on entries maintained at the control server.

15. The method of claim 1, further comprising the steps of:

designating the secondary server as a new primary server.

16. In a client-server system, a method of dynamically switching client-server connections, said method comprising the steps of:

identifying at least a primary server and a secondary server for a real-time data stream;

a client receiving the real-time data stream from the primary server;

the client detecting a failure in one or more of the real-time data stream and the primary server; and the client dynamically switching to the secondary server and receiving the real-time data stream from the secondary server, in response to said detecting step.

17. The method of claim 16, wherein the data stream is a multimedia data stream.

18. The method of claim 17, wherein the multimedia data is one or more of live digital audio and video data.

19. The method of claim 16, in a packet-switched network wherein said step of the client detecting a failure, further comprises the steps of:

monitoring the data stream for data arriving out of order; and comparing the order with a threshold.

20. The method of claim 19, wherein the data stream is communicated using a TCP/IP suite of protocols, said monitoring step further comprising the step of:

monitoring based on a mechanism selected from the group consisting of: packet numbering mechanisms available in TCP, and sequence numbering or time stamp capabilities of a Real-time Transport Protocol in combination with a User Datagram Protocol.

21. The method of claim 16, wherein the system includes a control server coupled to the client and said each set of servers, further comprising the steps of:

the client communicating a switch request to a control server, in response to said step of detecting the failure; and the control server identifying the secondary server based on entries maintained at a control server, in response to said detecting step.

22. The method of claim 21, further comprising the steps of:

the control server communicating an identifier of the primary server and the secondary server to the client, in response to the client requesting the data stream;

said step of the client dynamically switching comprising the step of the client communicating a request to the control server to switch to the secondary server including the identifier of the secondary server.

23. The method of claim 16, further comprising the steps of:

a control server communicating a switch signal to the client; and said step of the client dynamically switching comprising the step of the client communicating a switch request to the control server, in response to the switch signal; and the control server identifying the secondary server based on entries maintained at the control server.

24. The method of claim 23, further comprising the step of the control server designating the secondary server as a new primary server.

25. The method of claim 16, wherein said step of the client detecting a failure, further comprises the steps of:

measuring one or more of a received bit rate; frame rate; and sample rate associated with the data stream; and comparing the rate with a threshold.

26. A program storage device readable by a machine, tangibly embodying a program of instructions executable by the machine to perform method steps for dynamically switching client-server connections between a primary server and a secondary server for a real-time data stream, said method steps comprising:

a client receiving the real-time data stream from the primary server;

the client detecting a failure in one or more of the real-time data stream and the primary server; and the client dynamically switching to the secondary server and receiving the real-time data stream from the secondary server, in response to said detecting step.

27. The method of claim 26, wherein the data stream is a multimedia data stream.

28. The method of claim 27, wherein the multimedia data is one or more of live digital audio and video data.

29. The method of claim 26, in a packet-switched network wherein said step of the client detecting a failure, further comprises the steps of:

monitoring the data stream for data arriving out of order; and comparing the order with a threshold.

30. The method of claim 29, wherein the data stream is communicated using a TCP/EP suite of protocols, said monitoring step further comprising the step of:

monitoring based on a mechanism selected from the group consisting of: packet numbering mechanisms available in TCP, and sequence numbering or time stamp capabilities of a Real-time Transport Protocol in combination with a User Datagram Protocol.

31. The method of claim 26, wherein the system includes a control server coupled to the client and said each set of servers, further comprising the steps of:

the client communicating a switch request to a control server, in response to said step of detecting the failure; and the control server identifying the secondary server based on entries maintained at a control server, in response to said detecting step.

32. The method of claim 31, further comprising the steps of:

the control server communicating an identifier of the primary server and the secondary server to the client, in response to the client requesting the data stream;

said step of the client dynamically switching comprising the step of the client communicating a request to the control server to switch to the secondary server including the identifier of the secondary server.

33. The method of claim 26, further comprising the steps of:
a control server communicating a switch signal to the client; and
said step of the client dynamically switching comprising the step of the client communicating a switch request to the control server, in response to the switch signal; and
the control server identifying the secondary server based on entries maintained at the control server.

34. The method of claim 33, further comprising the step of the control server designating the secondary server as a new primary server.

35. The method of claim 26, wherein said step of the client detecting a failure, further comprises the steps of:
measuring one or more of a received bit rate; frame rate; and sample rate associated with the data stream; and
comparing the rate with a threshold.

36. A program storage device readable by a machine, tangibly embodying a program of instructions executable by the machine to perform method steps for dynamically switching client-server connections between two or more disjoint sets of servers wherein each set of servers includes at least one server, said method steps comprising:
a client requesting a real-time data stream;
assigning the client to a primary server in a first set of servers and a secondary set of servers, in response to said request;
the client receiving the real-time data stream from the primary server;
the client detecting a failure in one or more of the real-time data stream and the primary server; and
the client dynamically switching to and receiving the real-time data stream from a secondary server in the secondary set of servers, in response to said detecting step.

37. The program storage device of claim 36, wherein said step of dynamically switching to the secondary server, further comprises the steps of:
the client communicating a switch request to a control server;
the control server assigning the secondary server to the client, wherein the secondary server is a member of a set of servers different from the set of which the primary server is a member; and
establishing a new connection between the client and the secondary server.

38. The program storage device of claim 36, wherein said step of the client detecting a failure, further comprises the steps of:
measuring one or more of a received bit rate; frame rate; and sample rate associated with the data stream; and
comparing the rate with a threshold.

39. The program storage device of claim 36, wherein said step of the client detecting a failure, further comprises the steps of:
monitoring the data stream for data arriving out of order; and
comparing the order with a threshold.

40. The program storage device of claim 36, wherein the data stream is communicated using a TCP/IP suite of protocols, said monitoring step further comprising the step of:
monitoring based on a mechanism selected from the group consisting of: packet numbering mechanisms available in TCP, and sequence numbering or time stamp capabilities of a Real-time Transport Protocol in combination with a User Datagram Protocol.

41. The program storage device of claim 36, further comprising the steps of:
the client communicating a switch request to a control server, in response to said step of detecting the failure; and
the control server identifying the secondary server in the second set of servers based on entries maintained at a control server, in response to said detecting step.

42. The program storage device of claim 36, further comprising the steps of:
the control server communicating an identifier of the primary server and the secondary set of servers to the client, in response to the client requesting the data stream;
said step of the client dynamically switching comprising the step of the client communicating a switch request to the control server including the identifier of the secondary set of servers from which the secondary server is to be selected; and
the control server identifying the secondary server in the second set of servers in response to the client switch request.

43. The program storage device of claim 36, wherein the system includes a control server coupled to the client and said each set of servers, further comprising the steps of:
one of the primary server and the control server communicating a switch signal to the client; and
said step of the client dynamically switching comprising the step of the client communicating a request to the control server to switch to the alternate server, in response to the switch signal; and
the control server identifying the secondary server in the second set of servers based on entries maintained at the control server.

44. A computer program product comprising:
a computer usable medium having computer readable program code means embodied therein for dynamically switching client-server connections between a plurality of servers into two or more disjoint sets, wherein each set of servers includes at least one server; the computer readable program code means in said computer product comprising:
computer readable program code means for causing a computer to effect a client requesting a real-time data stream;
computer readable program code means for causing a computer to effect assigning the client to a primary server in a first set of servers and a secondary server in a second set of servers, in response to said request;
computer readable program code means for causing a computer to effect the client receiving the real-time data stream from the primary server;
computer readable program code means for causing a computer to effect the client detecting a failure in one or more of the real-time data stream and the primary server; and
computer readable program code means for causing a computer to effect the client dynamically switching to and receiving the real-time data stream from the secondary server, in response to said detecting step.

45. A computer program product comprising:

a computer usable medium having computer readable program code means embodied therein for dynamically switching client-server connections between a primary server and a secondary server for a real-time data stream, the computer readable program code means in said computer program product comprising:

computer readable program code means for causing a computer to effect a client receiving the real-time data stream from the primary server;

computer readable program code means for causing a computer to effect the client detecting a failure in one or more of the real-time data stream and the primary server; and computer readable program code means for causing a computer to effect the client dynamically switching to the secondary server and receiving the real-time data stream from the secondary server, in response to said detecting step.

46. A client-based system for dynamically switching client connections, comprising:

two or more disjoint sets of real-time streaming servers, each set including at least one real-time streaming server for delivering a real-time multimedia stream;

a control server coupled to the client and to the real-time streaming servers; and one or more client agents, coupled to the real-time streaming servers and the control server, for requesting and receiving and rendering the real-time multimedia stream;

the control further comprising:

control server means for processing incoming client agents and redirecting them to the real-time streaming server that can provide the real-time multimedia stream; each client agent comprising:

client agent means for detecting a failure and dynamically switching to and receiving the real-time multimedia stream from a secondary real-time streaming server, said client agent means coupled to the control server means.

\* \* \* \* \*